(12) United States Patent
Fux et al.

(10) Patent No.: US 7,797,629 B2
(45) Date of Patent: Sep. 14, 2010

(54) HANDHELD ELECTRONIC DEVICE AND METHOD FOR PERFORMING OPTIMIZED SPELL CHECKING DURING TEXT ENTRY BY PROVIDING A SEQUENTIALLY ORDERED SERIES OF SPELL-CHECK ALGORITHMS

(75) Inventors: Vadim Fux, Waterloo (CA); Dan Rubanovich, Toronto (CA)

(73) Assignee: Research In Motion Limited, Waterloo, Ontario (CA)

( * ) Notice: Subject to any disclaimer, the term of this patent is extended or adjusted under 35 U.S.C. 154(b) by 1197 days.

(21) Appl. No.: 11/398,222

(22) Filed: Apr. 5, 2006

(65) Prior Publication Data

US 2007/0240043 A1    Oct. 11, 2007

(51) Int. Cl.
G06F 17/00 (2006.01)
(52) U.S. Cl. ...................................... 715/257
(58) Field of Classification Search ................. 715/257, 715/256
See application file for complete search history.

(56) References Cited

U.S. PATENT DOCUMENTS

| | | | |
|---|---|---|---|
| 6,047,300 A | 4/2000 | Wallfish et al. | |
| 6,286,064 B1 * | 9/2001 | King et al. | 710/67 |
| 6,307,549 B1 * | 10/2001 | King et al. | 715/810 |
| 2002/0188448 A1 * | 12/2002 | Goodman et al. | 704/254 |
| 2002/0194229 A1 * | 12/2002 | Decime et al. | 707/533 |
| 2002/0196163 A1 * | 12/2002 | Bradford et al. | 341/22 |
| 2003/0011574 A1 * | 1/2003 | Goodman | 345/172 |
| 2003/0120779 A1 * | 6/2003 | Rodefer et al. | 709/225 |
| 2003/0145285 A1 * | 7/2003 | Miyahira et al. | 715/533 |
| 2004/0153975 A1 * | 8/2004 | Williams et al. | 715/531 |
| 2004/0155869 A1 * | 8/2004 | Robinson et al. | 345/168 |
| 2004/0210842 A1 * | 10/2004 | Qamar | 715/538 |
| 2005/0162395 A1 * | 7/2005 | Unruh | 345/169 |
| 2006/0271522 A1 * | 11/2006 | Scott et al. | 707/3 |
| 2007/0260635 A1 * | 11/2007 | Ramer et al. | 707/104.1 |
| 2008/0133522 A1 * | 6/2008 | Bordner et al. | 707/6 |
| 2008/0215557 A1 * | 9/2008 | Ramer et al. | 707/4 |
| 2009/0029687 A1 * | 1/2009 | Ramer et al. | 455/414.3 |

FOREIGN PATENT DOCUMENTS

EP    1035712    9/2000

OTHER PUBLICATIONS

Berger et al., "An Adaptive Information Retrieval System based on Associative Networks", APCCM, 2004, pp. 27-36.*
Moura et al., "Fast and Flexible Word Searching on Compressed Text", ACM Transactions on Information Systems, vol. 18, No. 2, Apr. 2000, pp. 113-139.*

(Continued)

Primary Examiner—Laurie Ries
(74) Attorney, Agent, or Firm—Finnegan, Henderson, Farabow, Garrett & Dunner, LLP

(57) ABSTRACT

A handheld electronic device includes a reduced QWERTY keyboard and is enabled with a disambiguation routine that is operable to disambiguate text input. In addition to identifying and outputting representations of language objects that are stored in the memory and that correspond with a text input, the device is able to perform a spell check routine during input of a text entry. The spell check routine subjects a text entry to a sequentially ordered series of spell-check algorithms and ceases subjecting the text entry to further spell-check algorithms upon identification of a predetermined quantity of spell-check language objects.

22 Claims, 9 Drawing Sheets

OTHER PUBLICATIONS

Dunlop, Mark et al., "Predictive Text Entry Methods for Mobile Phones", 2000, pp. 134-143.*

Martinis, Bruno et al., "Spelling Correction for Search Engine Queries", 2004, pp. 372-383.*

* cited by examiner

HANDHELD ELECTRONIC DEVICE AND METHOD FOR PERFORMING OPTIMIZED SPELL CHECKING DURING TEXT ENTRY BY PROVIDING A SEQUENTIALLY ORDERED SERIES OF SPELL-CHECK ALGORITHMS

BACKGROUND

1. Field

The disclosed and claimed concept relates generally to handheld electronic devices and, more particularly, to a handheld electronic device having a reduced keyboard and a text input disambiguation function that can provide a spell checking feature.

2. Background Information

Numerous types of handheld electronic devices are known. Examples of such handheld electronic devices include, for instance, personal data assistants (PDAs), handheld computers, two-way pagers, cellular telephones, and the like. Many handheld electronic devices also feature wireless communication capability, although many such handheld electronic devices are stand-alone devices that are functional without communication with other devices.

Such handheld electronic devices are generally intended to be portable, and thus are of a relatively compact configuration in which keys and other input structures often perform multiple functions under certain circumstances or may otherwise have multiple aspects or features assigned thereto. With advances in technology, handheld electronic devices are built to have progressively smaller form factors yet have progressively greater numbers of applications and features resident thereon. As a practical matter, the keys of a keypad can only be reduced to a certain small size before the keys become relatively unusable. In order to enable text entry, however, a keypad must be capable of entering all twenty-six letters of the Latin alphabet, for instance, as well as appropriate punctuation and other symbols.

One way of providing numerous letters in a small space has been to provide a "reduced keyboard" in which multiple letters, symbols, and/or digits, and the like, are assigned to any given key. For example, a touch-tone telephone includes a reduced keypad by providing twelve keys, of which ten have digits thereon, and of these ten keys eight have Latin letters assigned thereto. For instance, one of the keys includes the digit "2" as well as the letters "A", "B", and "C". Other known reduced keyboards have included other arrangements of keys, letters, symbols, digits, and the like. Since a single actuation of such a key potentially could be intended by the user to refer to any of the letters "A", "B", and "C", and potentially could also be intended to refer to the digit "2", the input generally is an ambiguous input and is in need of some type of disambiguation in order to be useful for text entry purposes.

In order to enable a user to make use of the multiple letters, digits, and the like on any given key, numerous keystroke interpretation systems have been provided. For instance, a "multi-tap" system allows a user to substantially unambiguously specify a particular character on a key by pressing the same key a number of times equivalent to the position of the desired character on the key. Another exemplary keystroke interpretation system would include key chording, of which various types exist. For instance, a particular character can be entered by pressing two keys in succession or by pressing and holding first key while pressing a second key. Still another exemplary keystroke interpretation system would be a "press-and-hold/press-and-release" interpretation function in which a given key provides a first result if the key is pressed and immediately released, and provides a second result if the key is pressed and held for a short period of time. Another keystroke interpretation system that has been employed is a software-based text disambiguation function. In such a system, a user typically presses keys to which one or more characters have been assigned, generally pressing each key one time for each desired letter, and the disambiguation software attempt to predict the intended input. Numerous such systems have been proposed, and while many have been generally effective for their intended purposes, shortcomings still exist.

For instance, even a single misspelling or mistyping error during text entry on a system employing disambiguation can result in text that bears little, if any, resemblance to what was intended by the user. Some spell check systems, if employed on a handheld electronic device employing disambiguation, would provide generally good results, but would also require an enormous amount of processing power, more than typically would be available for spell checking on that type of platform. Other spell check systems, if employed on a handheld electronic device employing disambiguation, would require far less processing power, but would provide results that are unacceptably poor.

It would be desirable to provide an improved handheld electronic device with a reduced keyboard that seeks to mimic a QWERTY keyboard experience or other particular keyboard experience, and that provides a spell checking operation that overcomes the shortcomings of disambiguation systems. Such an improved handheld electronic device might also desirably be configured with enough features to enable text entry and other tasks with relative ease.

BRIEF DESCRIPTION OF THE DRAWINGS

A full understanding of the disclosed and claimed concept can be gained from the following Description when read in conjunction with the accompanying drawings in which:

Similar numerals refer to similar parts throughout the specification.

DESCRIPTION

Figure 1:
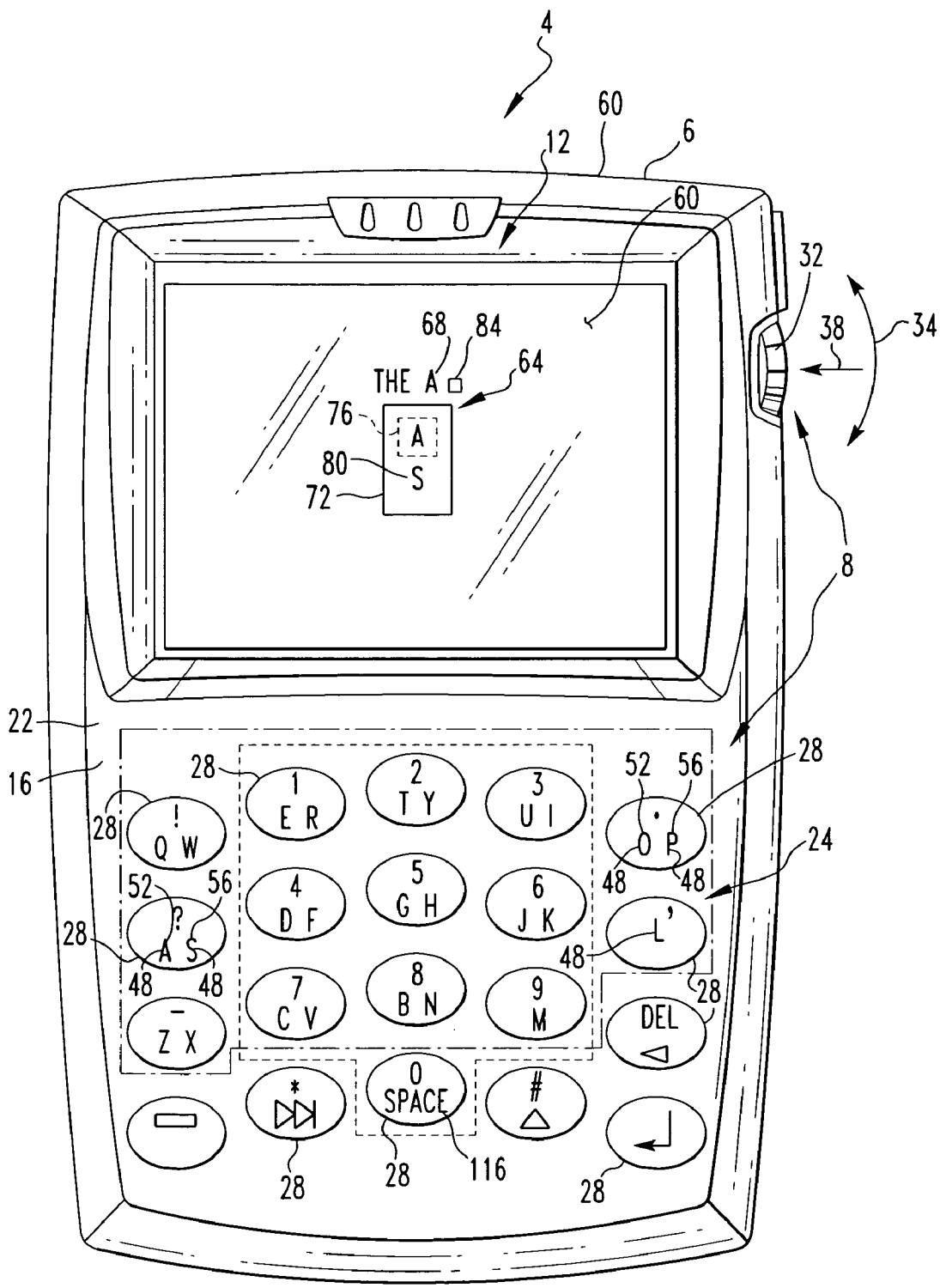
FIG. 1 is a top plan view of an improved handheld electronic device in accordance with the disclosed and claimed concept.
Figure 2:
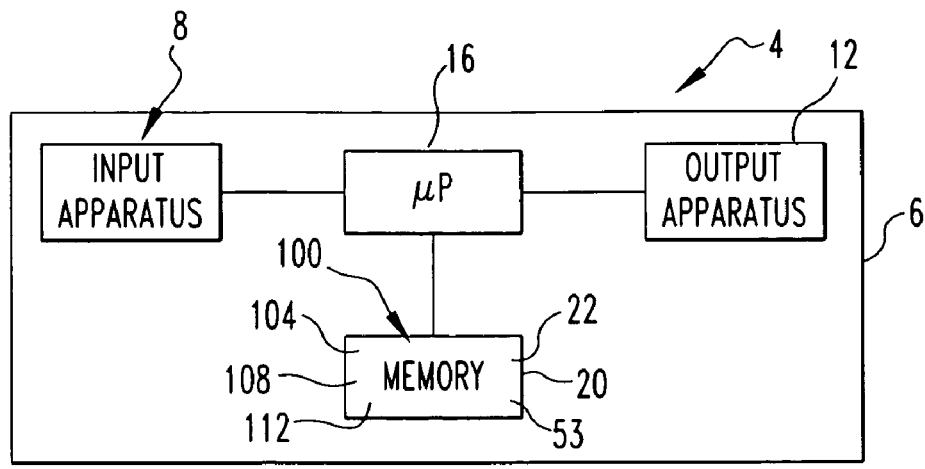
FIG. 2 is a schematic depiction of the improved handheld electronic device of FIG. 1.

An improved handheld electronic device 4 is indicated generally in FIG. 1 and is depicted schematically in FIG. 2. The exemplary handheld electronic device 4 includes a housing 6 upon which are disposed a processor unit that includes an input apparatus 8, an output apparatus 12, a processor 16, a memory 20, and at least a first routine. The processor 16 may be, for instance, and without limitation, a microprocessor (μP) and is responsive to inputs from the input apparatus 8 and provides output signals to the output apparatus 12. The processor 16 also interfaces with the memory 20. The processor 16 and the memory 20 together form a processor apparatus. Examples of handheld electronic devices are included in U.S. Pat. Nos. 6,452,588 and 6,489,950.

As can be understood from FIG. 1, the input apparatus 8 includes a keypad 24 and a thumbwheel 32. As will be described in greater detail below, the keypad 24 is in the exemplary form of a reduced QWERTY keyboard including a plurality of keys 28 that serve as input members. It is noted, however, that the keypad 24 may be of other configurations, such as an AZERTY keyboard, a QWERTZ keyboard, or other keyboard arrangement, whether presently known or unknown, and either reduced or not reduced. As employed herein, the expression "reduced" and variations thereof in the context of a keyboard, a keypad, or other arrangement of input members, shall refer broadly to an arrangement in which at least one of the input members has assigned thereto a plurality of linguistic elements such as, for example, characters in the set of Latin letters, whereby an actuation of the at least one of the input members, without another input in combination therewith, is an ambiguous input since it could refer to more than one of the plurality of linguistic elements assigned thereto. As employed herein, the expression "linguistic element" and variations thereof shall refer broadly to any element that itself can be a language object or from which a language object can be constructed, identified, or otherwise obtained, and thus would include, for example and without limitation, characters, letters, strokes, ideograms, phonemes, morphemes, digits, and the like. As employed herein, the expression "language object" and variations thereof shall refer broadly to any type of object that may be constructed, identified, or otherwise obtained from one or more linguistic elements, that can be used alone or in combination to generate text, and that would include, for example and without limitation, words, shortcuts, symbols, ideograms, and the like.

The system architecture of the handheld electronic device 4 advantageously is organized to be operable independent of the specific layout of the keypad 24. Accordingly, the system architecture of the handheld electronic device 4 can be employed in conjunction with virtually any keypad layout substantially without requiring any meaningful change in the system architecture. It is further noted that certain of the features set forth herein are usable on either or both of a reduced keyboard and a non-reduced keyboard.

The keys 28 are disposed on a front face of the housing 6, and the thumbwheel 32 is disposed at a side of the housing 6. The thumbwheel 32 can serve as another input member and is both rotatable, as is indicated by the arrow 34, to provide selection inputs to the processor 16, and also can be pressed in a direction generally toward the housing 6, as is indicated by the arrow 38, to provide another selection input to the processor 16.

As can further be seen in FIG. 1, many of the keys 28 include a number of linguistic elements 48 disposed thereon. As employed herein, the expression "a number of" and variations thereof shall refer broadly to any quantity, including a quantity of one. In the exemplary depiction of the keypad 24, many of the keys 28 include two linguistic elements, such as including a first linguistic element 52 and a second linguistic element 56 assigned thereto.

One of the keys 28 of the keypad 24 includes as the characters 48 thereof the letters "Q" and "W", and an adjacent key 28 includes as the characters 48 thereof the letters "E" and "R". It can be seen that the arrangement of the characters 48 on the keys 28 of the keypad 24 is generally of a QWERTY arrangement, albeit with many of the keys 28 including two of the characters 48.

The output apparatus 12 includes a display 60 upon which can be provided an output 64. An exemplary output 64 is depicted on the display 60 in FIG. 1. The output 64 includes a text component 68 and a variant component 72. The variant component 72 includes a default portion 76 and a variant portion 80. The display also includes a caret 84 that depicts generally where the next input from the input apparatus 8 will be received.

The text component 68 of the output 64 provides a depiction of the default portion 76 of the output 64 at a location on the display 60 where the text is being input. The variant component 72 is disposed generally in the vicinity of the text component 68 and provides, in addition to the default proposed output 76, a depiction of the various alternate text choices, i.e., alternates to the default proposed output 76, that are proposed by an input disambiguation function in response to an input sequence of key actuations of the keys 28.

As will be described in greater detail below, the default portion 76 is proposed by the disambiguation function as being the most likely disambiguated interpretation of the ambiguous input provided by the user. The variant portion 80 includes a predetermined quantity of alternate proposed interpretations of the same ambiguous input from which the user can select, if desired. It is noted that the exemplary variant portion 80 is depicted herein as extending vertically below the default portion 76, but it is understood that numerous other arrangements could be provided.

Figure 2A:
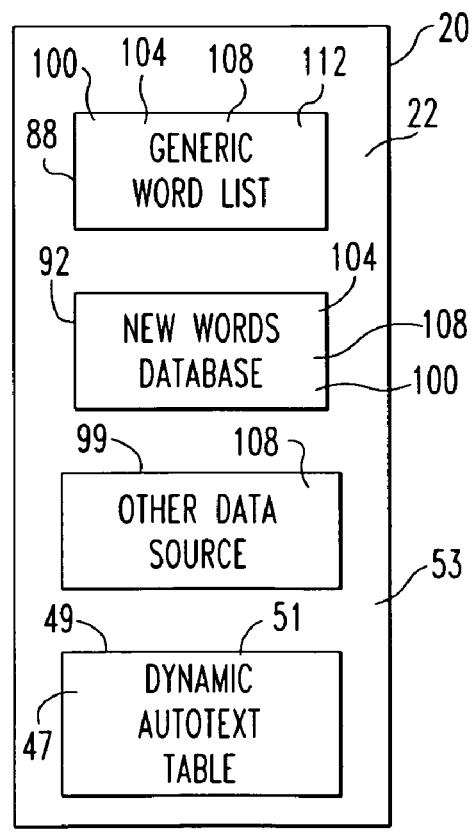
FIG. 2A is a schematic depiction of a portion of the handheld electronic device of FIG. 2.

The memory 20 is depicted schematically in FIG. 2A. The memory 20 can be any of a variety of types of internal and/or external storage media such as, without limitation, RAM, ROM, EPROM(s), EEPROM(s), and the like that provide a storage register for data storage such as in the fashion of an internal storage area of a computer, and can be volatile memory or nonvolatile memory. The memory 20 additionally includes a number of routines depicted generally with the numeral 22 for the processing of data. The routines 22 can be in any of a variety of forms such as, without limitation, software, firmware, and the like. As will be explained in greater detail below, the routines 22 include the aforementioned disambiguation function as an application, spell check routines, and other routines.

As can be understood from FIG. 2A, the memory 20 additionally includes data stored and/or organized in a number of tables, sets, lists, and/or otherwise. Specifically, the memory 20 includes a generic word list 88, a new words database 92, another data source 99 and a dynamic autotext table 49.

Stored within the various areas of the memory 20 are a number of language objects 100 and frequency objects 104. The language objects 100 generally are each associated with an associated frequency object 104. The language objects 100 include, in the present exemplary embodiment, a plurality of word objects 108 and a plurality of N-gram objects 112. The word objects 108 are generally representative of complete words within the language or custom words stored in the memory 20. For instance, if the language stored in the memory 20 is, for example, English, generally each word object 108 would represent a word in the English language or would represent a custom word.

Associated with substantially each word object 108 is a frequency object 104 having frequency value that is indicative of the relative frequency within the relevant language of the given word represented by the word object 108. In this regard, the generic word list 88 includes a plurality of word objects 108 and associated frequency objects 104 that together are representative of a wide variety of words and their relative frequency within a given vernacular of, for instance, a given language. The generic word list 88 can be derived in any of a wide variety of fashions, such as by analyzing numerous texts and other language sources to determine the various words within the language sources as well as their relative probabilities, i.e., relative frequencies, of occurrences of the various words within the language sources.

The N-gram objects 112 stored within the generic word list 88 are short strings of characters within the relevant language typically, for example, one to three characters in length, and typically represent word fragments within the relevant language, although certain of the N-gram objects 112 additionally can themselves be words. However, to the extent that an N-gram object 112 also is a word within the relevant language, the same word likely would be separately stored as a word object 108 within the generic word list 88. As employed herein, the expression "string" and variations thereof shall refer broadly to an object having one or more characters or components, and can refer to any of a complete word, a fragment of a word, a custom word or expression, and the like.

In the present exemplary embodiment of the handheld electronic device 4, the N-gram objects 112 include 1-gram objects, i.e., string objects that are one character in length, 2-gram objects, i.e., string objects that are two characters in length, and 3-gram objects, i.e., string objects that are three characters in length, all of which are collectively referred to as N-grams 112. Substantially each N-gram object 112 in the generic word list 88 is similarly associated with an associated frequency object 104 stored within the generic word list 88, but the frequency object 104 associated with a given N-gram object 112 has a frequency value that indicates the relative probability that the character string represented by the particular N-gram object 112 exists at any location within any word of the relevant language. The N-gram objects 112 and the associated frequency objects 104 are a part of the corpus of the generic word list 88 and are obtained in a fashion similar to the way in which the word object 108 and the associated frequency objects 104 are obtained, although the analysis performed in obtaining the N-gram objects 112 will be slightly different because it will involve analysis of the various character strings within the various words instead of relying primarily on the relative occurrence of a given word.

The present exemplary embodiment of the handheld electronic device 4, with its exemplary language being the English language, includes twenty-six 1-gram N-gram objects 112, i.e., one 1-gram object for each of the twenty-six letters in the Latin alphabet upon which the English language is based, and further includes 676 2-gram N-gram objects 112, i.e., twenty-six squared, representing each two-letter permutation of the twenty-six letters within the Latin alphabet.

The N-gram objects 112 also include a certain quantity of 3-gram N-gram objects 112, primarily those that have a relatively high frequency within the relevant language. The exemplary embodiment of the handheld electronic device 4 includes fewer than all of the three-letter permutations of the twenty-six letters of the Latin alphabet due to considerations of data storage size, and also because the 2-gram N-gram objects 112 can already provide a meaningful amount of information regarding the relevant language. As will be set forth in greater detail below, the N-gram objects 112 and their associated frequency objects 104 provide frequency data that can be attributed to character strings for which a corresponding word object 108 cannot be identified or has not been identified, and typically is employed as a fallback data source, although this need not be exclusively the case.

In the present exemplary embodiment, the language objects 100 and the frequency objects 104 are maintained substantially inviolate in the generic word list 88, meaning that the basic language dictionary remains substantially unaltered within the generic word list 88, and the learning functions that are provided by the handheld electronic device 4 and that are described below operate in conjunction with other object that are generally stored elsewhere in memory 20, such as, for example, in the new words database 92.

The new words database 92 stores additional word objects 108 and associated frequency objects 104 in order to provide to a user a customized experience in which words and the like that are used relatively more frequently by a user will be associated with relatively higher frequency values than might otherwise be reflected in the generic word list 88. More particularly, the new words database 92 includes word objects 108 that are user-defined and that generally are not found among the word objects 108 of the generic word list 88. Each word object 108 in the new words database 92 has associated therewith an associated frequency object 104 that is also stored in the new words database 92.

Figure 3A:
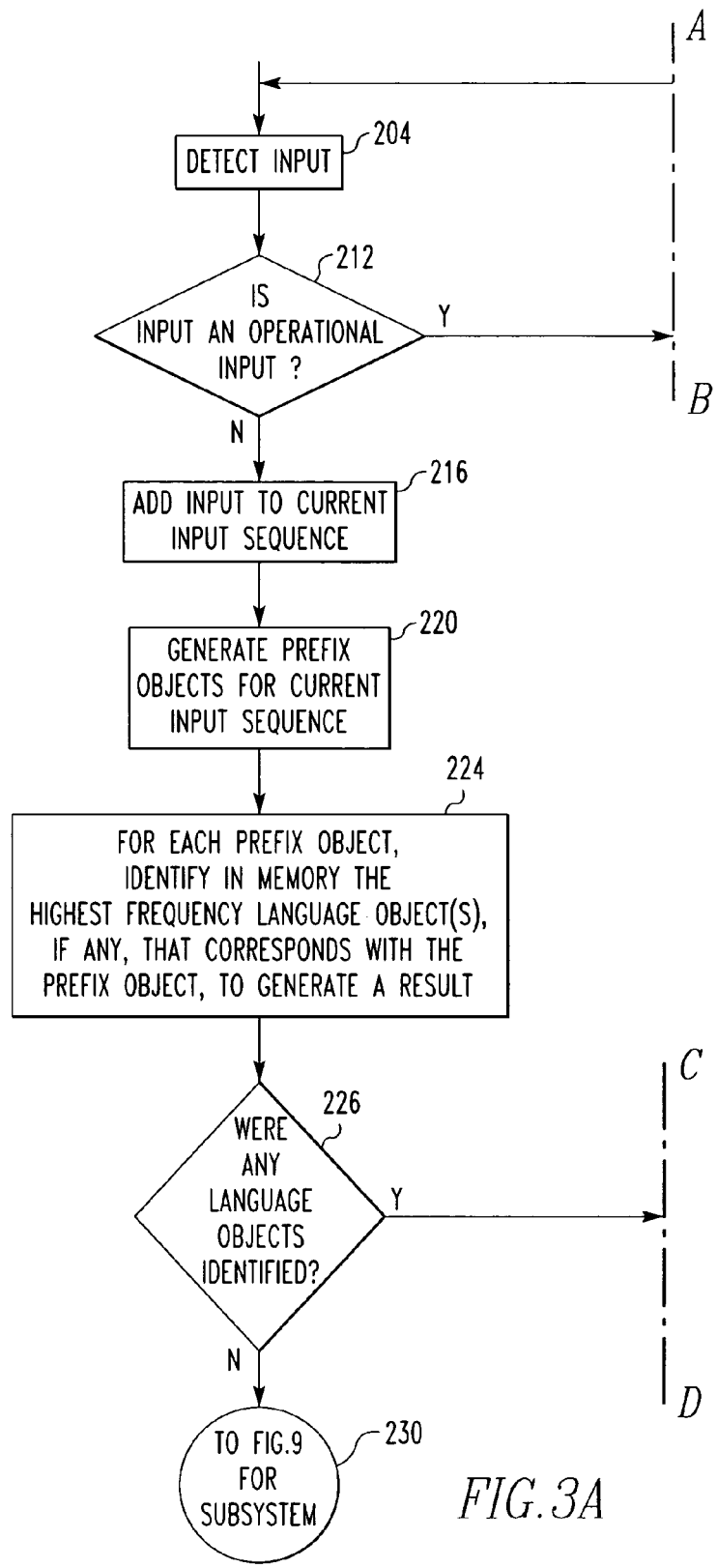
FIGS. 3A, 3B, and 3C are an exemplary flowchart depicting certain aspects of a disambiguation function that can be executed on the handheld electronic device of FIG. 1.
Figure 3B:
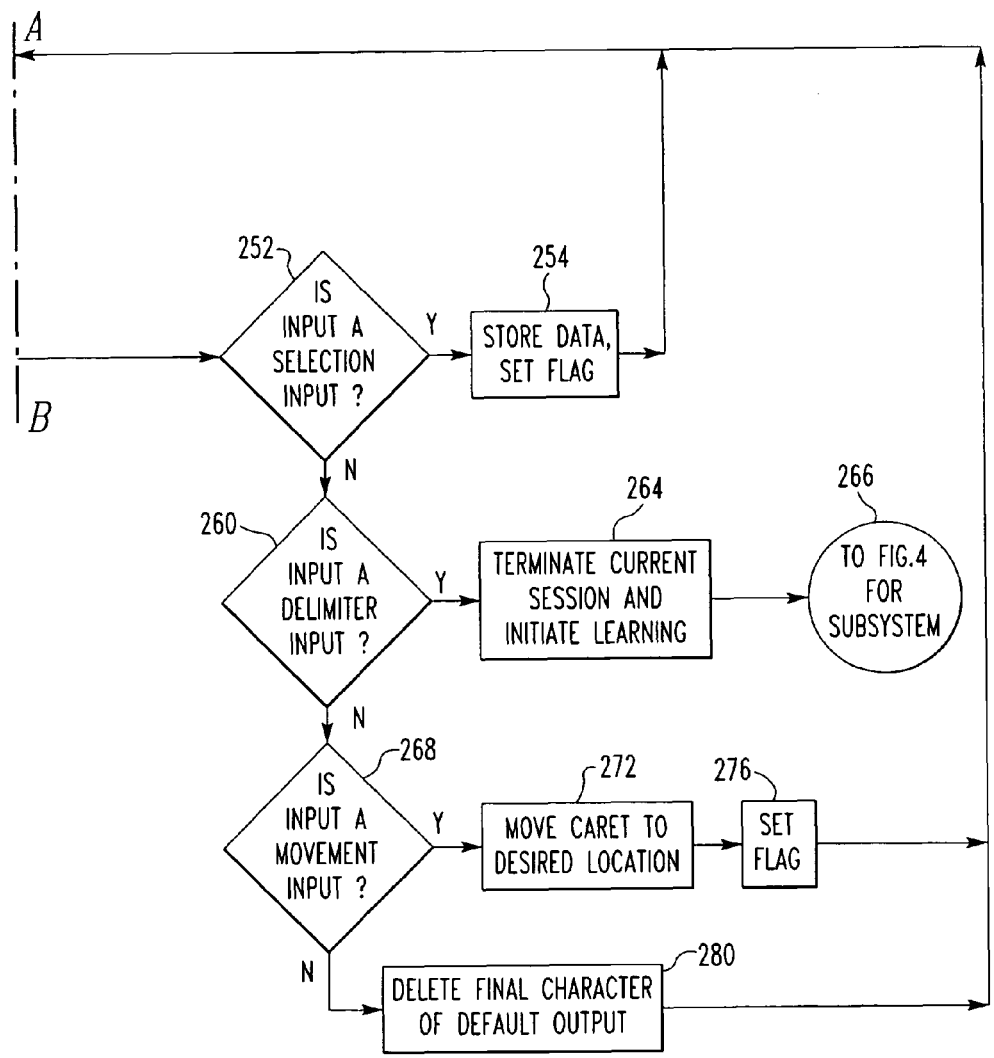
Figure 3C:
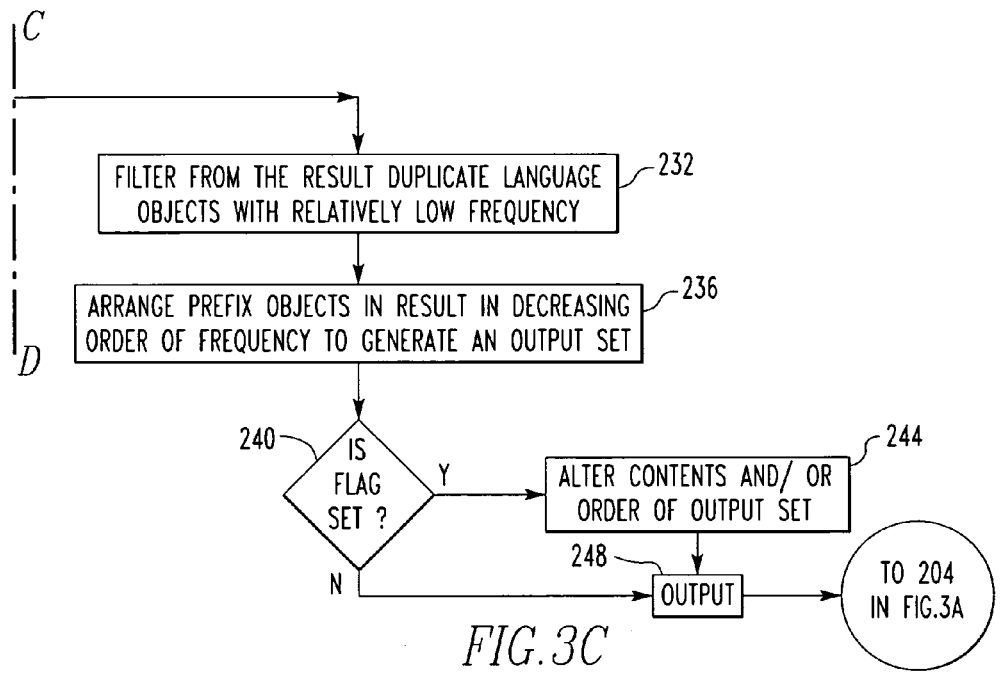

FIGS. 3A, 3B, and 3C depict in an exemplary fashion the general operation of certain aspects of the disambiguation function of the handheld electronic device 4. Additional features, functions, and the like are depicted and described elsewhere.

An input is detected, as at 204, and the input can be any type of actuation or other operation as to any portion of the input apparatus 8. A typical input would include, for instance, an actuation of a key 28 having a number of characters 48 thereon, or any other type of actuation or manipulation of the input apparatus 8.

The disambiguation function then determines, as at 212, whether the current input is an operational input, such as a selection input, a delimiter input, a movement input, an alternation input, or, for instance, any other input that does not constitute an actuation of a key 28 having a number of characters 48 thereon. If the input is determined at 212 to not be an operational input, processing continues at 216 by adding the input to the current input sequence which may or may not already include an input.

Many of the inputs detected at 204 are employed in generating input sequences as to which the disambiguation function will be executed. An input sequence is build up in each "session" with each actuation of a key 28 having a number of characters 48 thereon. Since an input sequence typically will be made up of at least one actuation of a key 28 having a plurality of characters 48 thereon, the input sequence will be ambiguous. When a word, for example, is completed the current session is ended an a new session is initiated.

An input sequence is gradually built up on the handheld electronic device 4 with each successive actuation of a key 28 during any given session. Specifically, once a delimiter input is detected during any given session, the session is terminated and a new session is initiated. Each input resulting from an actuation of one of the keys 28 having a number of the characters 48 associated therewith is sequentially added to the current input sequence. As the input sequence grows during a given session, the disambiguation function generally is executed with each actuation of a key 28, i.e., input, and as to the entire input sequence. Stated otherwise, within a given session, the growing input sequence is attempted to be disambiguated as a unit by the disambiguation function with each successive actuation of the various keys 28.

Once a current input representing a most recent actuation of the one of the keys 28 having a number of the characters 48 assigned thereto has been added to the current input sequence within the current session, as at 216 in FIG. 3A, the disambiguation function generates, as at 220, substantially all of the permutations of the characters 48 assigned to the various keys 28 that were actuated in generating the input sequence. In this regard, the "permutations" refer to the various strings that can result from the characters 48 of each actuated key 28 limited by the order in which the keys 28 were actuated. The various permutations of the characters in the input sequence are employed as prefix objects.

For instance, if the current input sequence within the current session is the ambiguous input of the keys "AS" and "OP", the various permutations of the first character 52 and the second character 56 of each of the two keys 28, when considered in the sequence in which the keys 28 were actuated, would be "SO", "SP", "AP", and "AO", and each of these is a prefix object that is generated, as at 220, with respect to the current input sequence. As will be explained in greater detail below, the disambiguation function seeks to identify for each prefix object one of the word objects 108 for which the prefix object would be a prefix.

For each generated prefix object, the memory 20 is consulted, as at 224, to identify, if possible, for each prefix object one of the word objects 108 in the memory 20 that corresponds with the prefix object, meaning that the sequence of letters represented by the prefix object would be either a prefix of the identified word object 108 or would be substantially identical to the entirety of the word object 108. Further in this regard, the word object 108 that is sought to be identified is the highest frequency word object 108. That is, the disambiguation function seeks to identify the word object 108 that corresponds with the prefix object and that also is associated with a frequency object 104 having a relatively higher frequency value than any of the other frequency objects 104 associated with the other word objects 108 that correspond with the prefix object.

It is noted in this regard that the word objects 108 in the generic word list 88 are generally organized in data tables that correspond with the first two letters of various words. For instance, the data table associated with the prefix "CO" would include all of the words such as "CODE", "COIN", "COMMUNICATION", and the like. Depending upon the quantity of word objects 108 within any given data table, the data table may additionally include sub-data tables within which word objects 108 are organized by prefixes that are three characters or more in length. Continuing onward with the foregoing example, if the "CO" data table included, for instance, more than 256 word objects 108, the "CO" data table would additionally include one or more sub-data tables of word objects 108 corresponding with the most frequently appearing three-letter prefixes. By way of example, therefore, the "CO" data table may also include a "COM" sub-data table and a "CON" sub-data table. If a sub-data table includes more than the predetermined number of word objects 108, for example a quantity of 256, the sub-data table may include further sub-data tables, such as might be organized according to a four letter prefixes. It is noted that the aforementioned quantity of 256 of the word objects 108 corresponds with the greatest numerical value that can be stored within one byte of the memory 20.

Accordingly, when, at 224, each prefix object is sought to be used to identify a corresponding word object 108, and for instance the instant prefix object is "AP", the "AP" data table will be consulted. Since all of the word objects 108 in the "AP" data table will correspond with the prefix object "AP", the word object 108 in the "AP" data table with which is associated a frequency object 104 having a frequency value relatively higher than any of the other frequency objects 104 in the "AP" data table is identified. The identified word object 108 and the associated frequency object 104 are then stored in a result register that serves as a result of the various comparisons of the generated prefix objects with the contents of the memory 20.

It is noted that one or more, or possibly all, of the prefix objects will be prefix objects for which a corresponding word object 108 is not identified in the memory 20. Such prefix objects are considered to be orphan prefix objects and are separately stored or are otherwise retained for possible future use. In this regard, it is noted that many or all of the prefix objects can become orphan object if, for instance, the user is trying to enter a new word or, for example, if the user has mis-keyed and no word corresponds with the mis-keyed input.

Processing thereafter continues, as at 226, where it is determined whether nor not any language objects 100 were identified at 224. If it is determined at 226 that no language objects were identified at 224, processing continues, as at 230, which sends processing to a spell checking operation depicted generally in FIG. 12, and which will be described in greater detail below.

If, however, it is determined at 226 that one or more language objects 100 were identified at 224, processing continues, as at 232 in FIG. 3C, where duplicate word objects 108 associated with relatively lower frequency values are deleted from the result. Such a duplicate word object 108 could be generated, for instance, by the other data source 99.

Once the duplicate word objects 108 and the associated frequency objects 104 have been removed at 232, processing continues, as at 236, wherein the remaining prefix objects are arranged in an output set in decreasing order of frequency value.

If it is determined, as at 240, that the flag has been set, meaning that a user has made a selection input, either through an express selection input or through an alternation input of a movement input, then the default output 76 is considered to be "locked," meaning that the selected variant will be the default prefix until the end of the session. If it is determined at 240 that the flag has been set, the processing will proceed to 244 where the contents of the output set will be altered, if needed, to provide as the default output 76 an output that includes the selected prefix object, whether it corresponds with a word object 108 or is an artificial variant. In this regard, it is understood that the flag can be set additional times during a session, in which case the selected prefix associated with resetting of the flag thereafter becomes the "locked" default output 76 until the end of the session or until another selection input is detected.

Processing then continues, as at 248, to an output step after which an output 64 is generated as described above. Processing thereafter continues at 204 where additional input is detected. On the other hand, if it is determined at 240 that the flag had not been set, then processing goes directly to 248 without the alteration of the contents of the output set at 244.

If the detected input is determined, as at 212, to be an operational input, processing then continues to determine the specific nature of the operational input. For instance, if it is determined, as at 252, that the current input is a selection input, processing continues at 254 where the flag is set. Processing then returns to detection of additional inputs as at 204.

Figure 4:
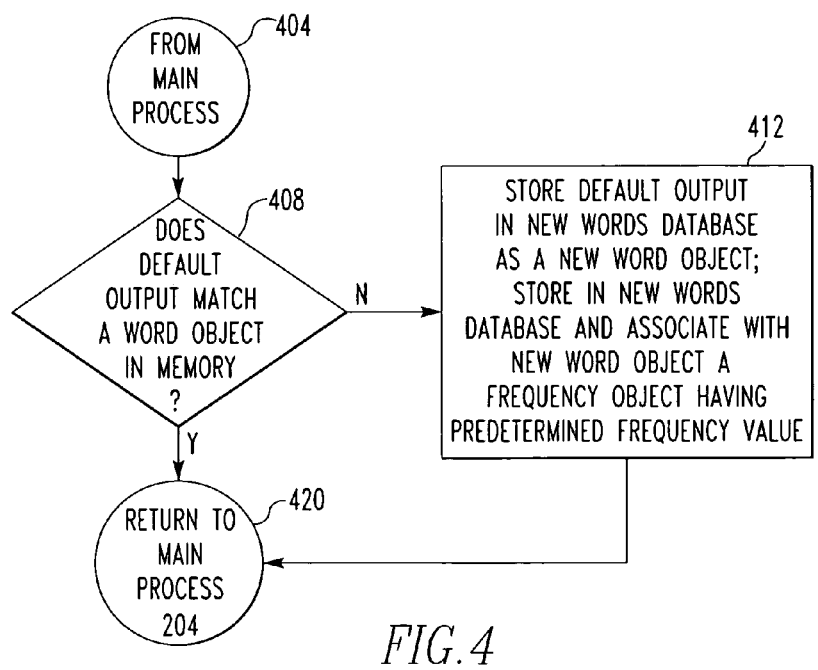
FIG. 4 is another exemplary flowchart depicting certain aspects of a learning method that can be executed on the handheld electronic device.

If it is determined, as at 260, that the input is a delimiter input, processing continues at 264 where the current session is terminated and processing is transferred, as at 266, to the learning function subsystem, as at 404 of FIG. 4. A delimiter input would include, for example, the actuation of a <SPACE> key 116, which would both enter a delimiter symbol and would add a space at the end of the word, actuation of the <ENTER> key, which might similarly enter a delimiter input and enter a space, and by a translation of the thumbwheel 32, such as is indicated by the arrow 38, which might enter a delimiter input without additionally entering a space.

It is first determined, as at 408, whether the default output at the time of the detection of the delimiter input at 260 matches a word object 108 in the memory 20. If it does not, this means that the default output is a user-created output that should be added to the new words database 92 for future use. In such a circumstance processing then proceeds to 412 where the default output is stored in the new words database 92 as a new word object 108. Additionally, a frequency object 104 is stored in the new words database 92 and is associated with the aforementioned new word object 108. The new frequency object 104 is given a relatively high frequency value, typically within the upper one-fourth or one-third of a predetermined range of possible frequency values.

In this regard, frequency objects 104 are given an absolute frequency value generally in the range of zero to 65,535. The maximum value represents the largest number that can be stored within two bytes of the memory 20. The new frequency object 104 that is stored in the new words database 92 is assigned an absolute frequency value within the upper one-fourth or one-third of this range, particularly since the new word was used by a user and is likely to be used again.

With further regard to frequency object 104, it is noted that within a given data table, such as the "CO" data table mentioned above, the absolute frequency value is stored only for the frequency object 104 having the highest frequency value within the data table. All of the other frequency objects 104 in the same data table have frequency values stored as percentage values normalized to the aforementioned maximum absolute frequency value. That is, after identification of the frequency object 104 having the highest frequency value within a given data table, all of the other frequency objects 104 in the same data table are assigned a percentage of the absolute maximum value, which represents the ratio of the relatively smaller absolute frequency value of a particular frequency object 104 to the absolute frequency value of the aforementioned highest value frequency object 104. Advantageously, such percentage values can be stored within a single byte of memory, thus saving storage space within the handheld electronic device 4.

Upon creation of the new word object 108 and the new frequency object 104, and storage thereof within the new words database 92, processing is transferred to 420 where the learning process is terminated. Processing is then returned to the main process, as at 204. If at 408 it is determined that the word object 108 in the default output 76 matches a word object 108 within the memory 20, processing is returned directly to the main process at 204.

With further regard to the identification of various word objects 108 for correspondence with generated prefix objects, it is noted that the memory 20 can include a number of additional data sources 99 in addition to the generic word list 88 and the new words database 92, all of which can be considered linguistic sources. It is understood that the memory 20 might include any number of other data sources 99. The other data sources 99 might include, for example, an address database, a speed-text database, or any other data source without limitation. An exemplary speed-text database might include, for example, sets of words or expressions or other data that are each associated with, for example, a character string that may be abbreviated. For example, a speed-text database might associate the string "br" with the set of words "Best Regards", with the intention that a user can type the string "br" and receive the output "Best Regards".

In seeking to identify word objects 108 that correspond with a given prefix object, the handheld electronic device 4 may poll all of the data sources in the memory 20. For instance the handheld electronic device 4 may poll the generic word list 88, the new words database 92, the other data sources 99, and the dynamic autotext table 49 to identify word objects 108 that correspond with the prefix object. The contents of the other data sources 99 may be treated as word objects 108, and the processor 16 may generate frequency objects 104 that will be associated with such word objects 108 and to which may be assigned a frequency value in, for example, the upper one-third or one-fourth of the aforementioned frequency range. Assuming that the assigned frequency value is sufficiently high, the string "br", for example, would typically be output to the display 60. If a delimiter input is detected with respect to the portion of the output having the association with the word object 108 in the speed-text database, for instance "br", the user would receive the output "Best Regards", it being understood that the user might also have entered a selection input as to the exemplary string "br".

The contents of any of the other data sources 99 may be treated as word objects 108 and may be associated with generated frequency objects 104 having the assigned frequency value in the aforementioned upper portion of the frequency range. After such word objects 108 are identified, the new word learning function can, if appropriate, act upon such word objects 108 in the fashion set forth above.

If it is determined, such as at 268, that the current input is a movement input, such as would be employed when a user is seeking to edit an object, either a completed word or a prefix object within the current session, the caret 84 is moved, as at 272, to the desired location, and the flag is set, as at 276. Processing then returns to where additional inputs can be detected, as at 204.

In this regard, it is understood that various types of movement inputs can be detected from the input device 8. For instance, a rotation of the thumbwheel 32, such as is indicated by the arrow 34 of FIG. 1, could provide a movement input. In the instance where such a movement input is detected, such as in the circumstance of an editing input, the movement input is additionally detected as a selection input. Accordingly, and as is the case with a selection input such as is detected at 252, the selected variant is effectively locked with respect to the default portion 76 of the output 64. Any default output 76 during the same session will necessarily include the previously selected variant.

In the present exemplary embodiment of the handheld electronic device 4, if it is determined, as at 252, that the input is not a selection input, and it is determined, as at 260, that the input is not a delimiter input, and it is further determined, as at 268, that the input is not a movement input, in the current exemplary embodiment of the handheld electronic device 4 the only remaining operational input generally is a detection of the <DELETE> key 86 of the keys 28 of the keypad 24. Upon detection of the <DELETE> key 86, the final character of the default output is deleted, as at 280. Processing thereafter returns to 204 where additional input can be detected.

An exemplary input sequence is depicted in FIGS. 1 and 5-8. In this example, the user is attempting to enter the word "APPLOADER", and this word presently is not stored in the memory 20. In FIG. 1 the user has already typed the "AS" key 28. Since the data tables in the memory 20 are organized according to two-letter prefixes, the contents of the output 64 upon the first keystroke are obtained from the N-gram objects 112 within the memory. The first keystroke "AS" corresponds with a first N-gram object 112 "S" and an associated frequency object 104, as well as another N-gram object 112 "A" and an associated frequency object 104. While the frequency object 104 associated with "S" has a frequency value greater than that of the frequency object 104 associated with "A", it is noted that "A" is itself a complete word. A complete word is always provided as the default output 76 in favor of other prefix objects that do not match complete words, regardless of associated frequency value. As such, in FIG. 1, the default portion 76 of the output 64 is "A".

Figure 5:
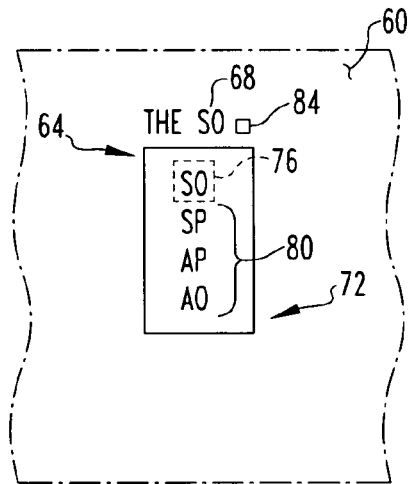
FIG. 5 is an exemplary output during a text entry operation.
Figure 6:
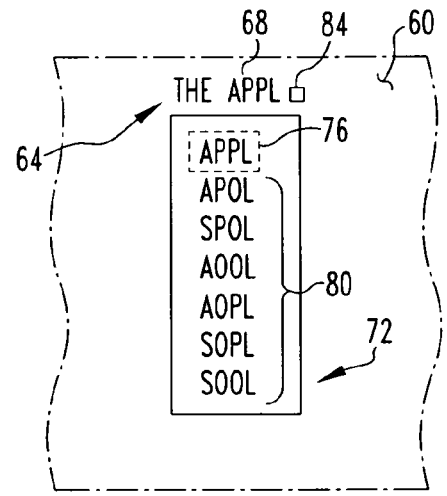
FIG. 6 is another exemplary output during another part of the text entry operation.

In FIG. 5, the user has additionally entered the "OP" key 28. The variants are depicted in FIG. 5. Since the prefix object "SO" is also a word, it is provided as the default output 76. In FIG. 6, the user has again entered the "OP" key 28 and has also entered the "L" key 28. It is noted that the exemplary "L" key 28 depicted herein includes only the single character 48 "L".

It is assumed in the instant example that no operational inputs have thus far been detected. The default output 76 is "APPL", such as would correspond with the word "APPLE". The prefix "APPL" is depicted both in the text component 68, as well as in the default portion 76 of the variant component 72. Variant prefix objects in the variant portion 80 include "APOL", such as would correspond with the word "APOLOGIZE", and the prefix "SPOL", such as would correspond with the word "SPOLIATION".

It is particularly noted that the additional variants "AOOL", "AOPL", "SOPL", and "SOOL" are also depicted as variants 80 in the variant component 72. Since no word object 108 corresponds with these prefix objects, the prefix objects are considered to be orphan prefix objects for which a corresponding word object 108 was not identified. In this regard, it may be desirable for the variant component 72 to include a specific quantity of entries, and in the case of the instant exemplary embodiment the quantity is seven entries. Upon obtaining the result at 224, if the quantity of prefix objects in the result is fewer than the predetermined quantity, the disambiguation function will seek to provide additional outputs until the predetermined number of outputs are provided.

Figure 7:
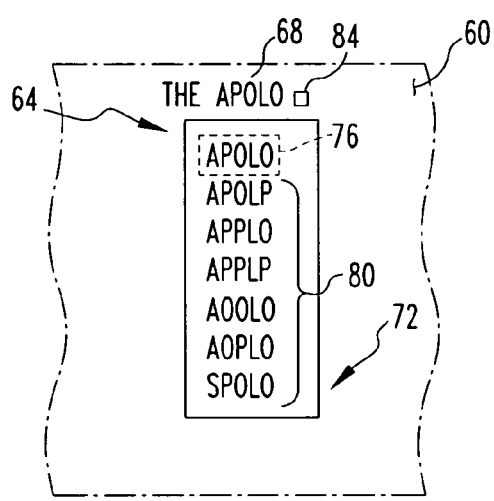
FIG. 7 is another exemplary output during another part of the text entry operation.

In FIG. 7 the user has additionally entered the "OP" key 28. In this circumstance, and as can be seen in FIG. 7, the default portion 76 of the output 64 has become the prefix object "APOLO" such as would correspond with the word "APOLOGIZE", whereas immediately prior to the current input the default portion 76 of the output 64 of FIG. 6 was "APPL" such as would correspond with the word "APPLE." Again, assuming that no operational inputs had been detected, the default prefix object in FIG. 7 does not correspond with the previous default prefix object of FIG. 6. As such, a first artificial variant "APOLP" is generated and in the current example is given a preferred position. The aforementioned artificial variant "APOLP" is generated by deleting the final character of the default prefix object "APOLO" and by supplying in its place an opposite character 48 of the key 28 which generated the final character of the default portion 76 of the output 64, which in the current example of FIG. 7 is "P", so that the aforementioned artificial variant is "APOLP".

Furthermore, since the previous default output "APPL" corresponded with a word object 108, such as the word object 108 corresponding with the word "APPLE", and since with the addition of the current input the previous default output "APPL" no longer corresponds with a word object 108, two additional artificial variants are generated. One artificial variant is "APPLP" and the other artificial variant is "APPLO", and these correspond with the previous default output "APPL" plus the characters 48 of the key 28 that was actuated to generate the current input. These artificial variants are similarly output as part of the variant portion 80 of the output 64.

As can be seen in FIG. 7, the default portion 76 of the output 64 "APOLO" no longer seems to match what would be needed as a prefix for "APPLOADER", and the user likely anticipates that the desired word "APPLOADER" is not already stored in the memory 20. As such, the user provides a selection input, such as by scrolling with the thumbwheel 32 until the variant string "APPLO" is highlighted. The user then continues typing and enters the "AS" key.

Figure 8:
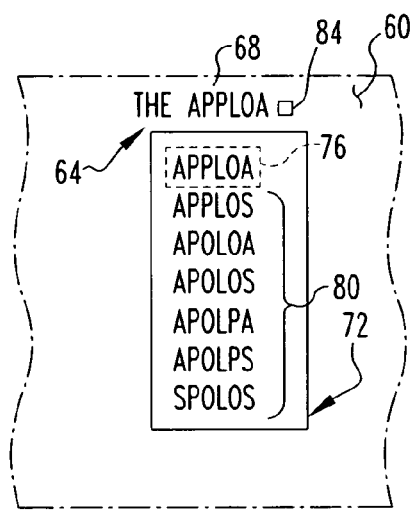
FIG. 8 is another exemplary output during another part of the text entry operation.

The output 64 of such action is depicted in FIG. 8. Here, the string "APPLOA" is the default portion 76 of the output 64. Since the variant string "APPLO" became the default portion 76 of the output 64 (not expressly depicted herein) as a result of the selection input as to the variant string "APPLO", and since the variant string "APPLO" does not correspond with a word object 108, the character strings "APPLOA" and "APPLOS" were created as artificial variants. Additionally, since the previous default of FIG. 7, "APOLO" previously had corresponded with a word object 108, but now is no longer in correspondence with the default portion 76 of the output 64 of FIG. 8, the additional artificial variants of "APOLOA" and "APOLOS" were also generated. Such artificial variants are given a preferred position in favor of the three displayed orphan prefix objects.

Since the current input sequence in the example no longer corresponds with any word object 108, the portions of the method related to attempting to find corresponding word objects 108 are not executed with further inputs for the current session. That is, since no word object 108 corresponds with the current input sequence, further inputs will likewise not correspond with any word object 108. Avoiding the search of the memory 20 for such nonexistent word objects 108 saves time and avoids wasted processing effort.

As the user continues to type, the user ultimately will successfully enter the word "APPLOADER" and will enter a delimiter input. Upon detection of the delimiter input after the entry of "APPLOADER", the learning function is initiated. Since the word "APPLOADER" does not correspond with a word object 108 in the memory 20, a new word object 108 corresponding with "APPLOADER" is generated and is stored in the new words database 92, along with a corresponding new frequency object 104 which is given an absolute frequency in the upper, say, one-third or one-fourth of the possible frequency range. In this regard, it is noted that the new words database 92 is generally organized in two-character prefix data tables similar to those found in the generic word list 88. As such, the new frequency object 104 is initially assigned an absolute frequency value, but upon storage the absolute frequency value, if it is not the maximum value within that data table, will be changed to include a normalized frequency value percentage normalized to whatever is the maximum frequency value within that data table.

It is noted that the layout of the characters 48 disposed on the keys 28 in FIG. 1 is an exemplary character layout that would be employed where the intended primary language used on the handheld electronic device 4 was, for instance, English. Other layouts involving these characters 48 and/or other characters can be used depending upon the intended primary language and any language bias in the makeup of the language objects 100.

Figure 9A:
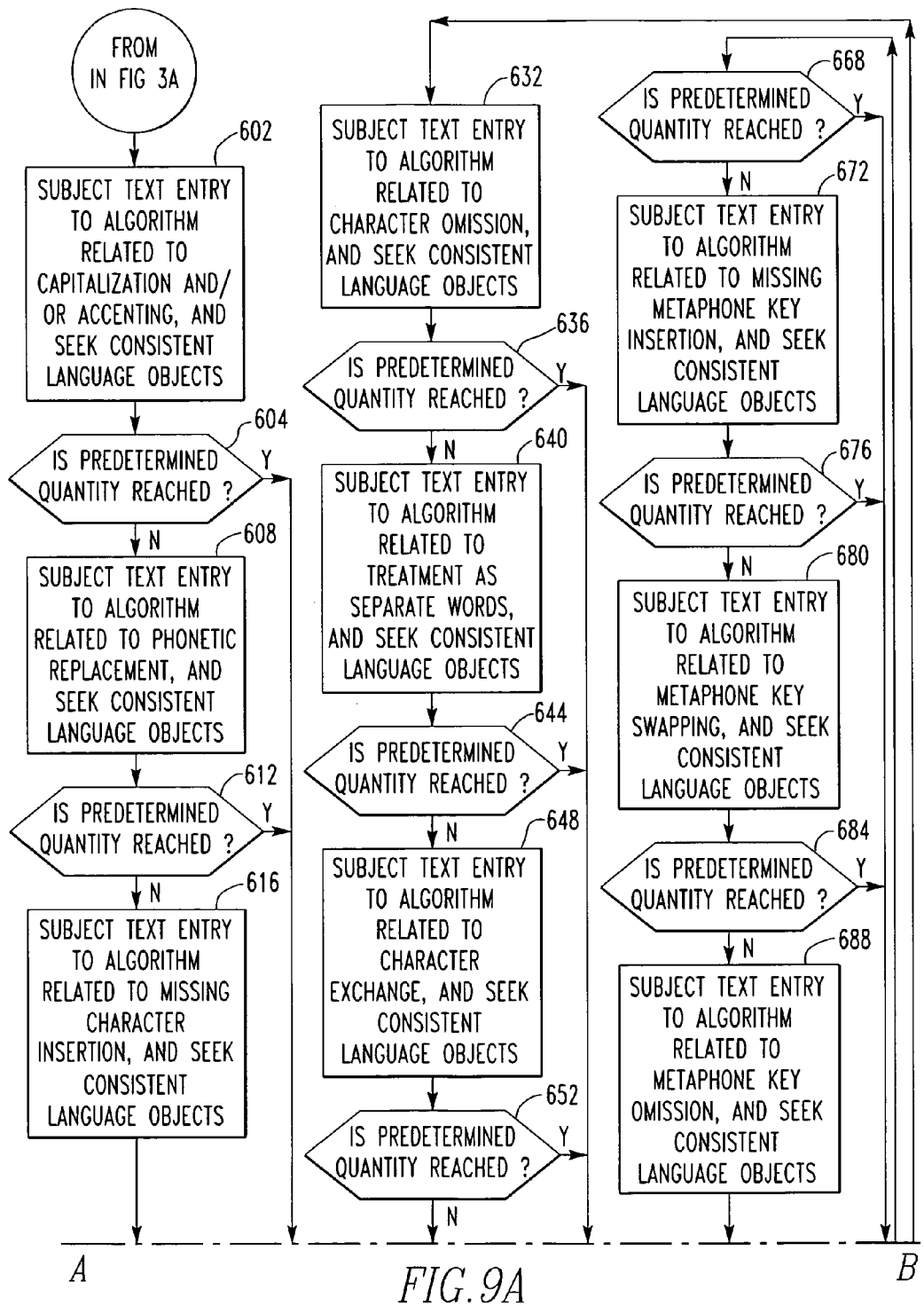
FIGS. 9A and 9B are an exemplary flowchart depicting a spell checking operation during a text entry operation.
Figure 9B:
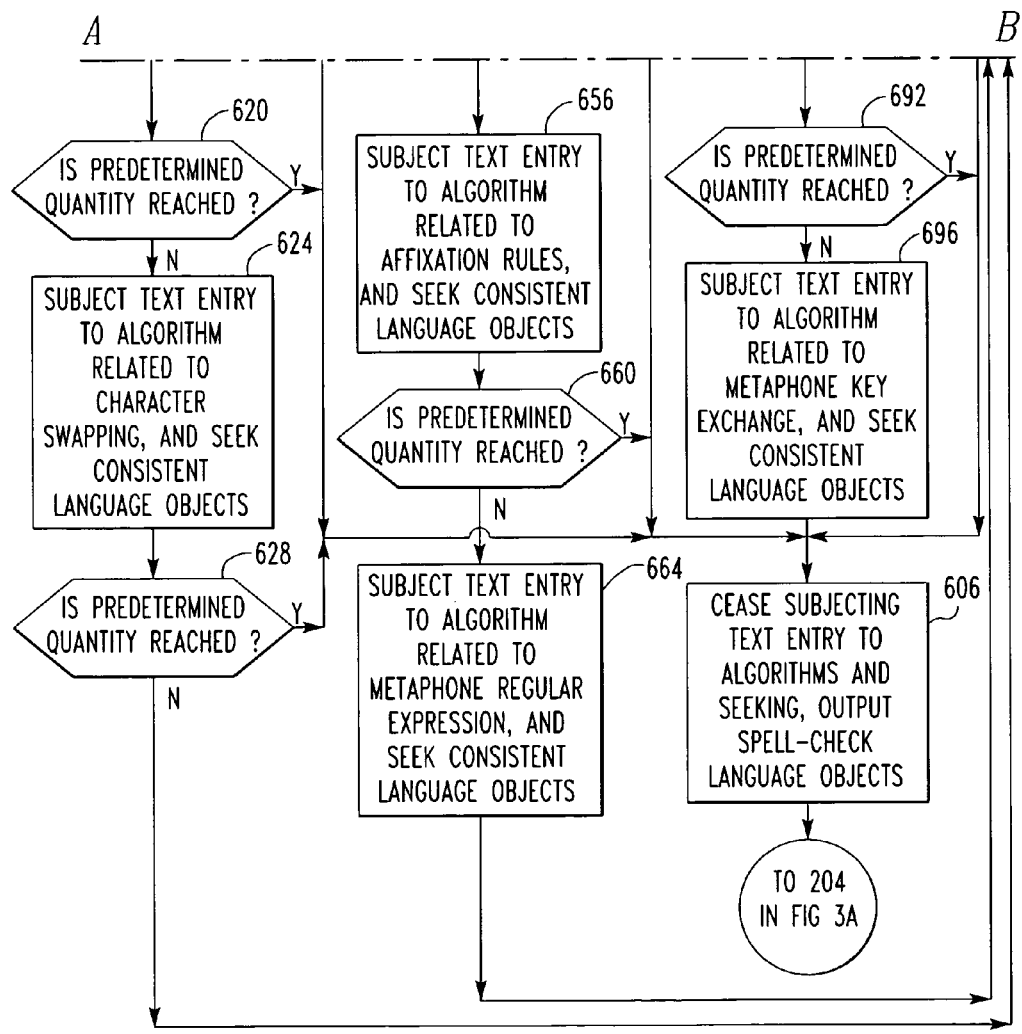

As mentioned elsewhere herein, if it is determined at 226 that no language objects 100 were identified at 224 as corresponding with the prefix objects, processing transfers, as at 230 in FIG. 3A, to the spell checking routine depicted generally in FIGS. 9A and 9B. As a general matter, the spell checking routine of the disclosed and claimed concept advantageously provides a series of sequentially ordered spell-check algorithms to which a text entry is subjected. Once a predetermined number of spell-check language objects 100 have been identified, such as through processing with the spell-check algorithms, further subjecting of the text entry to additional spell-check algorithms is ceased. In the exemplary embodiment described herein, the spell checking operation is performed on the various orphan prefix objects, i.e., the prefix objects for which no corresponding language object 100 was identified. It is further noted that certain of the orphan prefix objects might be artificial variants generated as described herein. It is understood, however, that the text entry that could be subjected to the disclosed and claimed process could be, for instance and without limitation, a keystroke sequence, a series of other linguistic elements, and the like.

Advantageously, the spell-check method is executed during entry of text, rather than waiting until a given text entry has been finalized. That is, the spell-check method of the disclosed and claimed concept is being executed during any given session on the handheld electronic device 4 and prior to detection of a delimiter input. As such, the user can be quickly apprised of the existence of a possible spelling error prior to fully keying a text entry, which facilitates correct text entry. In this regard, it is noted that spell check results are output as a general matter at a position of relatively lower priority than artificial variants. That is, the entry of new words is to be encouraged, and the entry of new words often accompanies the output of one or more artificial variants.

It is further noted, however, that the spell-check routine of the disclosed and claimed concept additionally can provide a learning function that can learn the various spelling errors that the particular user of the handheld electronic device typically makes and corrects. In the event such a learned spelling error is again entered by the user, the correctly spelled word reflected in the dynamic autotext table 49 is output as a default output, i.e., at a position of relative priority with respect to the artificial variants that are also output.

The spell-check algorithms are sequentially arranged in a specific order, meaning that a text entry is first processed according to a first spell-check algorithm and, if the identified spell-check language objects 100 do not reach a predetermined quantity, the text entry is processed according to a second spell-check algorithm. If the identified spell-check language objects 100 still do not reach the predetermined quantity, the text entry is processed according to a third spell-check algorithm, and so forth.

The spell-check algorithms, being sequentially ordered, can further be grouped as follows: A text entry will first be subjected to one or more spell-check algorithms related to character configuration which, in the present exemplary embodiment, is a spell-check algorithm that is related to ignoring capitalization and accenting. If the identified spell-check language objects 100 do not reach the predetermined quantity, the text entry is thereafter subjected to one or more spell-check algorithms related to misspelling which, in the present exemplary embodiment, is a spell-check algorithm that is related to phonetic replacement. If the identified spell-check language objects 100 do not reach the predetermined quantity, the text entry is thereafter subjected to one or more spell-check algorithms related to mistyping. In this regard, "misspelling" generally refers to a mistake by the user as to how a particular word, for instance, is spelled, such as if the user incorrectly believed that the word --their-- was actually spelled "their". In contrast, "mistyping" generally refers to a keying error by the user, such as if the user keyed an entry other than what was desired.

If the identified spell-check language objects 100 do not reach the predetermined quantity, the text entry is thereafter subjected to one or more spell-check algorithms that are related to specific affixation rules, which typically are locale specific. For instance, in the German language two known words are kapitan and patent. These two words can be combined into a single expression, but in order to do so an s must be affixed between the two, thus kapitanspatent. Other types of affixation rules will be apparent.

If the identified spell-check language objects 100 do not reach the predetermined quantity, the text entry is thereafter subjected to one or more spell-check algorithms related to metaphone analysis. As a general matter, a metaphone is a phonetic algorithm for indexing words by their sound. Both metaphone and phonetic rules are language-specific. Metaphones thus enable a linguistic expression to be characterized in a standardized fashion that is somewhat phonetic in nature. The use of metaphones can help to overcome certain misspelling errors.

To more specifically describe the process, a given text entry such as a string of characters is subjected to a given spell-check algorithm, which results in the generation of an expression. For instance, the spell check algorithm might be directed toward replacing a given character string with a phonetic replacement. The resultant "expression" thus would be a characterization of the text entry as processed by the algorithm. For instance, the character string "ph" might be phonetically replaced by "f" and/or "gh". The language sources in the memory 20 would then be consulted to see if any language objects 100 corresponding with the text input incorporating the phonetic replacements can be identified.

It is noted, however, that such a description is conceptual only, and that such processed or "resultant" character strings often are not searched individually. Rather, the result of subjecting a text entry to a spell-check algorithm can many times result in a "regular expression" which is a global characterization of the processed text entry. For instance, a "regular expression" would contain wild card characters that, in effect, characterize the result of all of the possible permutations of the text entry according to the particular spell-check algorithm. The result is that generally a single search can be performed on a "regular expression", with consequent savings in processing capacity and efficiency.

By way of example, if the user entered <OP><GH<>AS><BN>, such as might spell --phan--, the processing of --phan-- according to the exemplary phonetic replacement spell-check algorithm would result in the regular expression characterized as {f|v|ph|gh|}{a|ei|ey}n, by way of example. The "ph" can be phonetically replaced by any of "f", "v", "ph", and "gh", and the "a" can be replaced by and of "a", "ei", and "ey". The "n" does not have any phonetic equivalent. The generic word list 88, the new words database 92, the other data sources 99, and the dynamic autotext table 49 would be checked to see if any language object 100 could be identified as being consistent with the expression {f|v|ph|g|}{a|ei|ey}n. Any such identified language object 100 would be considered a spell-check language object 100. If, after such searching of the linguistic sources, the quantity of identified spell-check language objects 100 does not reach the predetermined quantity, the text entry --phan--, for example, would then be subjected to the sequentially next spell-check algorithm, which would result in the generation of a different regular expression or of other processed strings, which would then be the subject of one or more new searches of the linguistic data sources for language objects 100 that are consistent therewith.

As mentioned above, the first spell-check algorithm is one that ignores capitalization and/or accenting. The ignoring of capitalization and/or accenting can be performed with respect to capitalization and/or accenting that is contained in the text entry which is the subject of the search and/or that is contained in the stored language objects 100 being searched.

The sequentially next spell-check algorithm is the aforementioned phonetic replacement algorithm. Certain character strings are replaced, i.e., in a regular expression, to identify language objects 100 that are phonetically similar to the text entry. Some exemplary phonetic replacements are listed in Table 1.

TABLE 1

Exemplary English phonetic rules wherein the two strings on each line are phonetically interchangeable

| | |
|---|---|
| "a" | "ei" |
| "a" | "ey" |
| "ai" | "ie" |
| "air" | "ear" |
| "air" | "ere" |
| "air" | "are" |
| "are" | "ear" |
| "are" | "eir" |
| "are" | "air" |
| "cc" | "k" |
| "ch" | "te" |
| "ch" | "ti" |
| "ch" | "k" |
| "ch" | "tu" |
| "ch" | "s" |
| "ci" | "s" |
| "ear" | "air" |
| "ear" | "are" |
| "ear" | "ere" |
| "ear" | "ier" |
| "eau" | "o" |
| "ee" | "i" |
| "ei" | "a" |
| "eir" | "are" |
| "eir" | "ere" |
| "ere" | "ear" |
| "ere" | "air" |
| "ere" | "eir" |
| "ew" | "oo" |
| "ew" | "ue" |
| "ew" | "u" |
| "ew" | "o" |
| "ew" | "ui" |
| "ey" | "a" |
| "f" | "ph" |
| "f" | "gh" |
| "ge" | "j" |
| "gg" | "j" |
| "gh" | "f" |
| "i" | "igh" |
| "i" | "ee" |
| "i" | "uy" |
| "ie" | "ai" |

TABLE 1-continued

Exemplary English phonetic rules wherein the two strings on each line are phonetically interchangeable

| | |
|---|---|
| "ier" | "ear" |
| "ieu" | "oo" |
| "ieu" | "u" |
| "igh" | "i" |
| "j" | "ge" |
| "j" | "di" |
| "j" | "gg" |
| "k" | "qu" |
| "k" | "cc" |
| "k" | "ch" |
| "kw" | "qu" |
| "o" | "eau" |
| "o" | "ew" |
| "oe" | "u" |
| "oo" | "u" |
| "oo" | "ui" |
| "oo" | "ew" |
| "oo" | "ieu" |
| "ph" | "f" |
| "qu" | "k" |
| "qu" | "w" |
| "s" | "ch" |
| "s" | "ti" |
| "s" | "ci" |
| "shun" | "tion" |
| "shun" | "sion" |
| "shun" | "cion" |
| "ss" | "z" |
| "te" | "ch" |
| "ti" | "s" |
| "tu" | "ch" |
| "u" | "ieu" |
| "u" | "oo" |
| "u" | "ew" |
| "u" | "oe" |
| "ue" | "ew" |
| "uff" | "ough" |
| "ui" | "ew" |
| "ui" | "oo" |
| "uy" | "i" |
| "w" | "qu" |
| "z" | "ss" |

Each string in a text entry is replaced with all of the phonetic equivalents of the string. Regular expressions can sometimes be advantageously employed if multiple phonetic equivalents exist, as in the example presented above.

The sequentially next five spell-check algorithms fall within the group of "mistyping" spell-check algorithms. The first of these is the missing character insertion algorithm. Each letter of the alphabet is added after each character of the text entry, again, as may be characterized in a regular expression.

The sequentially next algorithm is the character swapping algorithm wherein each sequential pair of characters in the text entry are swapped with one another. Thus, the text entry --phan-- would result in the character strings --hpan-- --pahn-- and --phna--. These three strings would then be the subject of separate searches of the linguistic data sources.

The sequentially next algorithm is the character omission algorithm wherein each character is individually omitted. Thus, the text entry --phan-- would result in the character strings --han-- --pan-- --phn-- and --pha--. These four strings would then be the subject of separate searches of the linguistic data sources.

The sequentially next algorithm is wherein the text is treated as two separate words. This can be accomplished, for instance, by inserting a <SPACE> between adjacent letter or, for instance, can be accomplished by simply searching a first portion and a second portion of the text entry as separate words, i.e., as separate sub-entries. Other ways of searching a text entry as two separate words will be apparent.

The sequentially next algorithm, and the final "mistyping" algorithm, is the character replacement algorithm wherein each character is individually replaced by the other characters in the alphabet. A regular expression may result from subjecting the text entry to the algorithm.

The sequentially next algorithm is the spell-check algorithms that are related to specific affixation rules, which typically are locale specific. As suggested above, in the German language an s must be affixed between the two known words kapitan and patent to form the combination thereof, thus kapitanspatent. Other types of affixation rules will be apparent.

The next and final rules are related to metaphone analysis. The first rule relates to generation of a metaphone regular expression, and then identifying language objects 100 in the linguistic sources that are consistent with the metaphone regular expression. Four additional and optional metaphone-related spell-check algorithms, which are described in greater detail below, relate to metaphone manipulation.

Regarding the first metaphone-related spell-check algorithm, it is noted that the metaphone regular expression can be formed, as a general matter, by deleting from the text input all of the vowel sounds and by replacing all of the phonetically equivalent character strings with a standard metaphone "key". For instance, the various character strings "ssia", "ssio", "sia", "sio", "sh", "cia", "sh", "tio", "tia", and "tch" would each be replaced with the metaphone key "X". The characters strings "f", "v", and "ph" would each be replaced with the metaphone key "F". The metaphone regular expression is then created by placing an optional vowel wild card, which can constitute any number of different vowel sounds or no vowel sound, between each metaphone key. Searching using the metaphone regular expression can produce excellent spell-check results, i.e., excellent spell-check language objects 100, but the searching that is required can consume significant processing resources. As such, the metaphone regular expression spell-check algorithm is advantageously performed only after the execution of many other spell-check algorithms that require much less processing resource and which resulted in too few spell-check results.

The last four spell-check algorithms are optional and relate to metaphone manipulation and bear some similarity to the character "mistyping" spell-check algorithms described above. More particularly, after the metaphone regular expression has been created, the four metaphone manipulation spell-check algorithms relate to manipulation of the metaphone keys within the metaphone regular expression. Specifically, and in sequential order, the last four spell check-algorithms are a missing metaphone key insertion spell-check algorithm, a metaphone key swapping spell-check algorithm, a metaphone key omission spell-check algorithm, and a metaphone key exchange spell-check algorithm. These all operate in a fashion similar to those of the corresponding character-based "mistyping" algorithms mentioned above, except involving manipulations to the metaphone keys within the metaphone regular expression.

The spell-check process is depicted generally in FIGS. 9A and 9B and is described herein. Processing starts at 602 where the text entry is subjected to the spell-check algorithm related to ignoring capitalization and/or accenting, and the linguistic data sources are searched for spell-check language objects 100. Any spell-check language objects 100 that are found are added to a list. It is then determined at 604 whether or not the quantity of spell-check language objects 100 in the list has reached the predetermined quantity. If the predetermined quantity has been reached, processing continues to 606 where the spell-check language objects 100 are output. Processing thereafter returns to the main process at 204 in FIG. 3A.

On the other hand, if it is determined at 604 that the predetermined quantity has not been reached, processing continues to 608 where the text entry is subjected to the spell-check algorithm related to phonetic replacement, and the linguistic data sources are searched for spell-check language objects 100. Any spell-check language objects 100 that are found are added to the list. It is then determined at 612 whether or not the quantity of spell-check language objects 100 in the list has reached the predetermined quantity. If the predetermined quantity has been reached, processing continues to 606 where the spell-check language objects 100 are output.

Otherwise, processing continues to 616 where the text entry is subjected to the spell-check algorithm related to missing character insertion, and the linguistic data sources are searched for spell-check language objects 100. Any spell-check language objects 100 that are found are added to the list. It is then determined at 620 whether or not the quantity of spell-check language objects 100 in the list has reached the predetermined quantity. If the predetermined quantity has been reached, processing continues to 606 where the spell-check language objects 100 are output.

Otherwise, processing continues to 624 where the text entry is subjected to the spell-check algorithm related to character swapping, and the linguistic data sources are searched for spell-check language objects 100. Any spell-check language objects 100 that are found are added to the list. It is then determined at 628 whether or not the quantity of spell-check language objects 100 in the list has reached the predetermined quantity. If the predetermined quantity has been reached, processing continues to 606 where the spell-check language objects 100 are output.

Otherwise, processing continues to 632 where the text entry is subjected to the spell-check algorithm related to character omission, and the linguistic data sources are searched for spell-check language objects 100. Any spell-check language objects 100 that are found are added to the list. It is then determined at 636 whether or not the quantity of spell-check language objects 100 in the list has reached the predetermined quantity. If the predetermined quantity has been reached, processing continues to 606 where the spell-check language objects 100 are output.

Otherwise, processing continues to 640 where the text entry is subjected to the spell-check algorithm related to treatment of the text entry as separate words, and the linguistic data sources are searched for spell-check language objects 100. Any spell-check language objects 100 that are found are added to the list. It is then determined at 644 whether or not the quantity of spell-check language objects 100 in the list has reached the predetermined quantity. If the predetermined quantity has been reached, processing continues to 606 where the spell-check language objects 100 are output.

Otherwise, processing continues to 648 where the text entry is subjected to the spell-check algorithm related to character exchange, and the linguistic data sources are searched for spell-check language objects 100. Any spell-check language objects 100 that are found are added to the list. It is then determined at 652 whether or not the quantity of spell-check language objects 100 in the list has reached the predetermined quantity. If the predetermined quantity has been reached, processing continues to 606 where the spell-check language objects 100 are output.

Otherwise, processing continues to 656 where the text entry is subjected to the spell-check algorithm related to affixation rules, and the linguistic data sources are searched for spell-check language objects 100. Any spell-check language objects 100 that are found are added to the list. It is then determined at 660 whether or not the quantity of spell-check language objects 100 in the list has reached the predetermined quantity. If the predetermined quantity has been reached, processing continues to 606 where the spell-check language objects 100 are output.

Otherwise, processing continues to 664 where the text entry is subjected to the spell-check algorithm related to creation of the metaphone regular expression, and the linguistic data sources are searched for spell-check language objects 100. Any spell-check language objects 100 that are found are added to the list. It is then determined at 668 whether or not the quantity of spell-check language objects 100 in the list has reached the predetermined quantity. If the predetermined quantity has been reached, processing continues to 606 where the spell-check language objects 100 are output.

Otherwise, processing continues to 672 where the text entry is subjected to the spell-check algorithm related to missing metaphone key insertion, and the linguistic data sources are searched for spell-check language objects 100. Any spell-check language objects 100 that are found are added to the list. It is then determined at 676 whether or not the quantity of spell-check language objects 100 in the list has reached the predetermined quantity. If the predetermined quantity has been reached, processing continues to 606 where the spell-check language objects 100 are output.

Otherwise, processing continues to 680 where the text entry is subjected to the spell-check algorithm related to metaphone key swapping, and the linguistic data sources are searched for spell-check language objects 100. Any spell-check language objects 100 that are found are added to the list. It is then determined at 684 whether or not the quantity of spell-check language objects 100 in the list has reached the predetermined quantity. If the predetermined quantity has been reached, processing continues to 606 where the spell-check language objects 100 are output.

Otherwise, processing continues to 688 where the text entry is subjected to the spell-check algorithm related to metaphone key omission, and the linguistic data sources are searched for spell-check language objects 100. Any spell-check language objects 100 that are found are added to the list. It is then determined at 692 whether or not the quantity of spell-check language objects 100 in the list has reached the predetermined quantity. If the predetermined quantity has been reached, processing continues to 606 where the spell-check language objects 100 are output.

Otherwise, processing continues to 696 where the text entry is subjected to the spell-check algorithm related to metaphone key exchange, and the linguistic data sources are searched for spell-check language objects 100. Processing thereafter continues to 606 where the spell-check language objects 100 are output. Processing afterward returns to the main process at 204 in FIG. 3A.

The exemplary embodiment also includes a dynamic autotext feature which provides a learning function related to the learning of spelling errors commonly made and otherwise corrected by the particular user of the handheld electronic device 4. For instance, and as is depicted generally in FIG. 10, the user may wish to input the incorrectly-spelled expression --thier--. The user may have entered the keys 28 <TY><GH><UI><ER> pursuant to typing the first four letters thereof. The default output 68 in such a situation would be the character strings "thir", such as might correspond with the word "third". A variant 80 "thie" might also be output, such as might correspond with "thief". An artificial variant 80 "thue" may also be output at a position of relatively lower priority.

Upon entry of the fifth keystroke of the incorrectly-spelled expression --thier--, i.e., <ER>, no language object in the generic word list 88, the new words database 92, or in the other data sources 99 corresponds with the text entry. That is, word context has been lost. However, responsive to the loss of such context the spell-check routine is initiated, as at 602 in FIG. 9A, and it is determined that the correctly spelled --their-- would be a valid spell-check language object 100 for this text entry.

Figure 11:
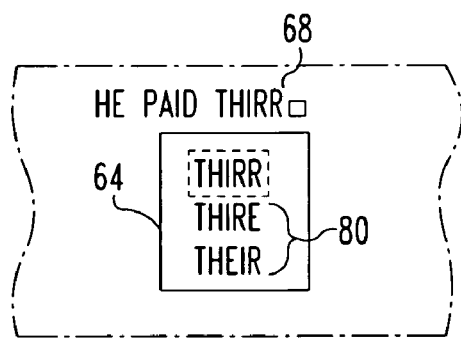
FIG. 11 is another exemplary output during another part of the text entry operation.

However, if the user has not previously made and corrected this particular spelling error, the resultant output will be such as that depicted generally in FIG. 11. Specifically, the artificial variants --thirr-- and --thire-- are output at a position of preference with respect to the spell-check language object 100 --their--. Specifically, --thirr-- is the default output 68, and the expression --thire-- and --their-- are output as variants 80, with the spell-check language object 100 --their-- being less preferred. Again, the outputting of artificial variants at a position of preference with respect to spell-check language objects 100 prior to the system learning the specific spelling error advantageously promotes the entry of new words.

However, once the user has selected the spell-check language object 100 --their--, such as with a selection input, the spell-check routine detects the selection of a less-preferred spell-check language object 100 and performs a learning function. Specifically, the spell-check routine stores the erroneous text object --thier-- as a reference object 47 in the dynamic autotext table 49. The spell-check routine also stores the correct spelling --their-- as a value object 51 in the dynamic autotext table 49 and associates the reference object 47 and the value object 51. As such, and as is depicted generally in FIG. 12, the next time the erroneous key input <TY><GH><UI><ER><ER> is entered by the user, the reference object 47 --thier-- is identified in the dynamic autotext table 49, and the associated value object 51 --their-- is output as a default output 68. The artificial variants --thirr-- and --thire-- are output as variants 80.

Figure 10:
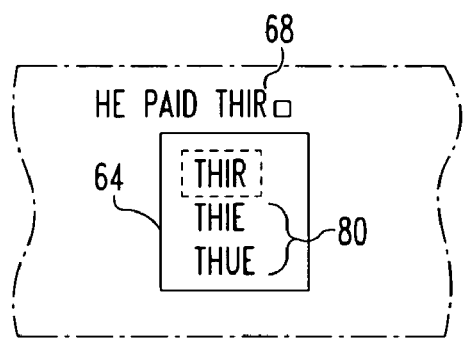
FIG. 10 is another exemplary output during another part of the text entry operation.
Figure 12:
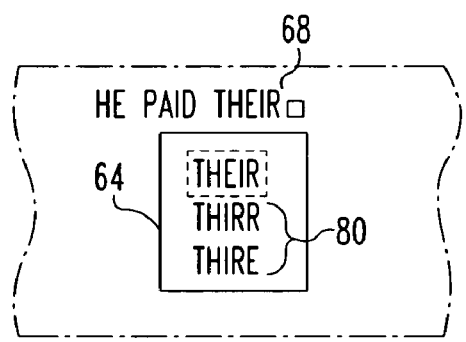
FIG. 12 is another exemplary output during another part of the text entry operation.

As can be understood in FIGS. 11 and 12, the spell-check routine is advantageously configured to output spell-check language object 100 in the same variant component region 64 where prefix objects that corresponded with language objects 100 were output, as in FIG. 10. It thus can be seen that the spell-check routine provides an output that is advantageously integrated into the disambiguation 22 to provide to the user interface of the handheld electronic device 4 an overall integrated appearance. The spell-check routine functions and provides spell-check language objects 100 prior to ending of a text entry session, and rather provides such spell-check language objects 100 during the entry of a text entry and prior to entry of a delimiter. It is understood that the spell check routine can also function after entry of a text entry, i.e., after ending of the specific session during which the given text entry was entered.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A method of enabling a spell-check operation on a text entry on a handheld electronic device having stored for execution thereon a number of sequentially ordered spell-check algorithms, the method comprising:

on the handheld electronic device, subjecting the text entry to a spell-check algorithm to obtain a resultant expression, and seeking for inclusion in a list any language object that is consistent with the resultant expression;

repeating on the text entry said subjecting and said seeking as to a next sequentially ordered spell-check algorithm when the quantity of language objects in the list has not reached a predetermined quantity;

ceasing said subjecting and said seeking as to further spell-check algorithms when the quantity of language objects in the list reaches the predetermined quantity;

subjecting the text entry to at least a first spell-check algorithm related to character configuration;

employing as the at least first spell-check algorithm related to character configuration at least a first spell-check algorithm related to ignoring at least one of capitalization and accenting; and subsequent to said subjecting the text entry to at least a first spell-check algorithm related to character configuration, and when the quantity of language objects in the list has not reached the predetermined quantity, subjecting the text entry to at least a first spell-check algorithm related to misspelling.

2. The method of claim 1, further comprising employing as the at least first spell-check algorithm related to misspelling at least a first spell-check algorithm related to phonetic replacement.

3. The method of claim 1, further comprising, subsequent to said subjecting the text entry to at least a first spell-check algorithm related to misspelling, and when the quantity of language objects in the list has not reached the predetermined quantity, subjecting the text entry to at least a first spell-check algorithm related to mistyping.

4. The method of claim 3, further comprising employing as the at least first spell-check algorithm related to mistyping at least one of:
- a spell-check algorithm related to missing character insertion;
- a spell-check algorithm related to character swapping;
- a spell-check algorithm related to character omission;
- a spell-check algorithm related to at least one of insertion of a <SPACE> and separation of the entry into a pair of separate sub-entries; and
- a spell-check algorithm related to character exchange.

5. The method of claim 3, further comprising employing as the at least first spell-check algorithm related to mistyping any at least two of the following in the gross order of:
- a spell-check algorithm related to missing character insertion;
- a spell-check algorithm related to character swapping;
- a spell-check algorithm related to character omission;
- a spell-check algorithm related to at least one of insertion of a <SPACE> and separation of the entry into a pair of separate sub-entries; and
- a spell-check algorithm related to character exchange.

6. The method of claim 3, further comprising, subsequent to said subjecting the text entry to at least a first spell-check algorithm related to mistyping, and when the quantity of language objects in the list has not reached the predetermined quantity, subjecting the text entry to at least a first spell-check algorithm related to metaphone analysis.

7. The method of claim 6, further comprising employing as the at least a first spell-check algorithm related to metaphone analysis at least a first spell-check algorithm related to generation of a metaphone regular expression.

8. The method of claim 7, further comprising, subsequent to said subjecting the text entry to at least a first spell-check algorithm related to generation of a metaphone regular expression, and when the quantity of language objects in the list has not reached the predetermined quantity, subjecting the text entry to at least a first spell-check algorithm related to metaphone manipulation.

9. The method of claim 8, further comprising employing as the at least first spell-check algorithm related to metaphone manipulation at least one of:
- a spell-check algorithm related to missing metaphone key insertion;
- a spell-check algorithm related to metaphone key swapping;
- a spell-check algorithm related to metaphone key omission; and
- a spell-check algorithm related to metaphone key exchange.

10. The method of claim 8, further comprising employing as the at least first spell-check algorithm related to metaphone manipulation any at least two of the following in the gross order of:
- a spell-check algorithm related to missing metaphone key insertion;
- a spell-check algorithm related to metaphone key swapping;
- a spell-check algorithm related to metaphone key omission; and
- a spell-check algorithm related to metaphone key exchange.

11. The method of claim 6, further comprising, subsequent to said subjecting the text entry to at least a first spell-check algorithm related to mistyping, and prior to said subjecting the text entry to at least a first spell-check algorithm related to metaphone analysis, and when the quantity of language objects in the list has not reached the predetermined quantity, subjecting the text entry to at least a first spell-check algorithm related to a predetermined affixation rule.

12. A handheld electronic device comprising an input apparatus, a processor apparatus, and an output apparatus, the input apparatus comprising a number of input members, at least some of the input members having a number of linguistic elements assigned thereto, at least some of the input members each having as the number of linguistic elements assigned thereto a plurality of linguistic elements, the processor apparatus comprising a processor and a memory having stored therein a plurality of objects comprising a plurality of language objects, at least some of the language objects each comprising a number of the linguistic elements, the memory having stored therein a number of routines which, when executed by the processor, cause the handheld electronic device to be adapted to perform operations comprising:

subjecting the text entry to a spell-check algorithm to obtain a resultant expression, and seeking for inclusion in a list any language object that is consistent with the resultant expression;

repeating on the text entry said subjecting and said seeking as to a next sequentially ordered spell-check algorithm when the quantity of language objects in the list has not reached a predetermined quantity;

ceasing said subjecting and said seeking as to further spell-check algorithms when the quantity of language objects in the list reaches the predetermined quantity;

subjecting the text entry to at least a first spell-check algorithm related to character configuration;

employing as the at least first spell-check algorithm related to character configuration at least a first spell-check algorithm related to ignoring at least one of capitalization and accenting; and subsequent to said subjecting the text entry to at least a first spell-check algorithm related to character configuration, and when the quantity of language objects in the list has not reached the predetermined quantity, subjecting the text entry to at least a first spell-check algorithm related to misspelling.

13. The handheld electronic device of claim 12 wherein the operations further comprise employing as the at least first spell-check algorithm related to misspelling at least a first spell-check algorithm related to phonetic replacement.

14. The handheld electronic device of claim 12 wherein the operations further comprise, subsequent to said subjecting the text entry to at least a first spell-check algorithm related to misspelling, and when the quantity of language objects in the list has not reached the predetermined quantity, subjecting the text entry to at least a first spell-check algorithm related to mistyping.

15. The handheld electronic device of claim 14 wherein the operations further comprise employing as the at least first spell-check algorithm related to mistyping at least one of:
   a spell-check algorithm related to missing character insertion;
   a spell-check algorithm related to character swapping;
   a spell-check algorithm related to character omission;
   a spell-check algorithm related to at least one of insertion of a <SPACE> and separation of the entry into a pair of separate sub-entries; and
   a spell-check algorithm related to character exchange.

16. The handheld electronic device of claim 14 wherein the operations further comprise employing as the at least first spell-check algorithm related to mistyping any at least two of the following in the gross order of:
   a spell-check algorithm related to missing character insertion;
   a spell-check algorithm related to character swapping;
   a spell-check algorithm related to character omission;
   a spell-check algorithm related to at least one of insertion of a <SPACE> and separation of the entry into a pair of separate sub-entries; and
   a spell-check algorithm related to character exchange.

17. The handheld electronic device of claim 14 wherein the operations further comprise, subsequent to said subjecting the text entry to at least a first spell-check algorithm related to mistyping, and when the quantity of language objects in the list has not reached the predetermined quantity, subjecting the text entry to at least a first spell-check algorithm related to metaphone analysis.

18. The handheld electronic device of claim 17 wherein the operations further comprise employing as the at least a first spell-check algorithm related to metaphone analysis at least a first spell-check algorithm related to generation of a metaphone regular expression.

19. The handheld electronic device of claim 18 wherein the operations further comprise, subsequent to said subjecting the text entry to at least a first spell-check algorithm related to generation of a metaphone regular expression, and when the quantity of language objects in the list has not reached the predetermined quantity, subjecting the text entry to at least a first spell-check algorithm related to metaphone manipulation.

20. The handheld electronic device of claim 19 wherein the operations further comprise employing as the at least first spell-check algorithm related to metaphone manipulation at least one of:
   a spell-check algorithm related to missing metaphone key insertion;
   a spell-check algorithm related to metaphone key swapping;
   a spell-check algorithm related to metaphone key omission; and
   a spell-check algorithm related to metaphone key exchange.

21. The handheld electronic device of claim 19 wherein the operations further comprise employing as the at least first spell-check algorithm related to metaphone manipulation any at least two of the following in the gross order of:
   a spell-check algorithm related to missing metaphone key insertion;
   a spell-check algorithm related to metaphone key swapping;
   a spell-check algorithm related to metaphone key omission; and
   a spell-check algorithm related to metaphone key exchange.

22. The handheld electronic device of claim 17 wherein the operations further comprise, subsequent to said subjecting the text entry to at least a first spell-check algorithm related to mistyping, and prior to said subjecting the text entry to at least a first spell-check algorithm related to metaphone analysis, and when the quantity of language objects in the list has not reached the predetermined quantity, subjecting the text entry to at least a first spell-check algorithm related to a predetermined affixation rule.

* * * * *